United States Patent [19]
Murakami

[11] Patent Number: 5,678,104
[45] Date of Patent: Oct. 14, 1997

[54] FIELD SIZE SWITCHING MECHANISM FOR A CAMERA

[75] Inventor: Hiroshi Murakami, Tochigi-ken, Japan

[73] Assignee: Nikon Corporation, Tokyo, Japan

[21] Appl. No.: 391,176

[22] Filed: Feb. 21, 1995

[30] Foreign Application Priority Data

Feb. 21, 1994 [JP] Japan .................................. 6-044762

[51] Int. Cl.$^6$ ..................................................... G03B 17/02
[52] U.S. Cl. ............................................................ 396/436
[58] Field of Search ..................................... 354/159, 222; 396/435, 436

[56] References Cited

U.S. PATENT DOCUMENTS

| | | |
|---|---|---|
| 5,325,140 | 6/1994 | Iorikoshi et al. . |
| 5,335,031 | 8/1994 | Ogawa . |
| 5,345,285 | 9/1994 | Hasushita et al. . |
| 5,367,351 | 11/1994 | Suzuka . |
| 5,386,259 | 1/1995 | Ichikawa et al. . |

FOREIGN PATENT DOCUMENTS

5-72655  3/1993  Japan .

Primary Examiner—David M. Gray
Attorney, Agent, or Firm—Oliff & Berridge

[57] ABSTRACT

A variable field size shooting camera includes a mechanism for varying the size of the shooting field between at least two sizes. The switching between sizes is accomplished by providing a pair of light shielding members that enable a change of field size. The light shielding members are positioned between a shutter having a cover plate and the body having the exposure aperture unit. Moving of the light shielding members is achieved by a switching mechanism. The light shielding members are attached to a support member on the front surface of the body to support the light shielding members so the light shielding members move freely. A clear image is obtained by having a space between the body having an exposure aperture unit and the light shielding member virtually non-existent. This minimizes the blurring of subjects in the surrounding area of the field during a large size shooting.

40 Claims, 6 Drawing Sheets

FIG. 6
PRIOR ART

FIELD SIZE SWITCHING MECHANISM FOR A CAMERA

BACKGROUND OF THE INVENTION

1. Field of the Invention

The present invention relates to a camera having a trimming function enabling the changing of the field shooting size and position of the exposure plane.

2. Description of Related Art

In recent years, in addition to full size (24 mm×36 mm) and half size (17 mm×36 mm) shooting fields, a new panorama size (13 mm×36 mm) has become available as a field size. A camera capable of switching to panoramic shooting size is provided with a light shielding member to change the field size. A switching mechanism moves the light shielding member to switch between a normal shooting field size and a panoramic shooting field size.

Moreover, in recent years, a camera, such as disclosed in Japanese Laid-open Patent Publication 5-72655, achieves panoramic shooting by providing a focal plane shutter internally within the camera. A light shielding member is assembled between the shutter and the body, forming a film running space for film passage where the space for the film is only 0.2–0.5 mm.

Figure 6:
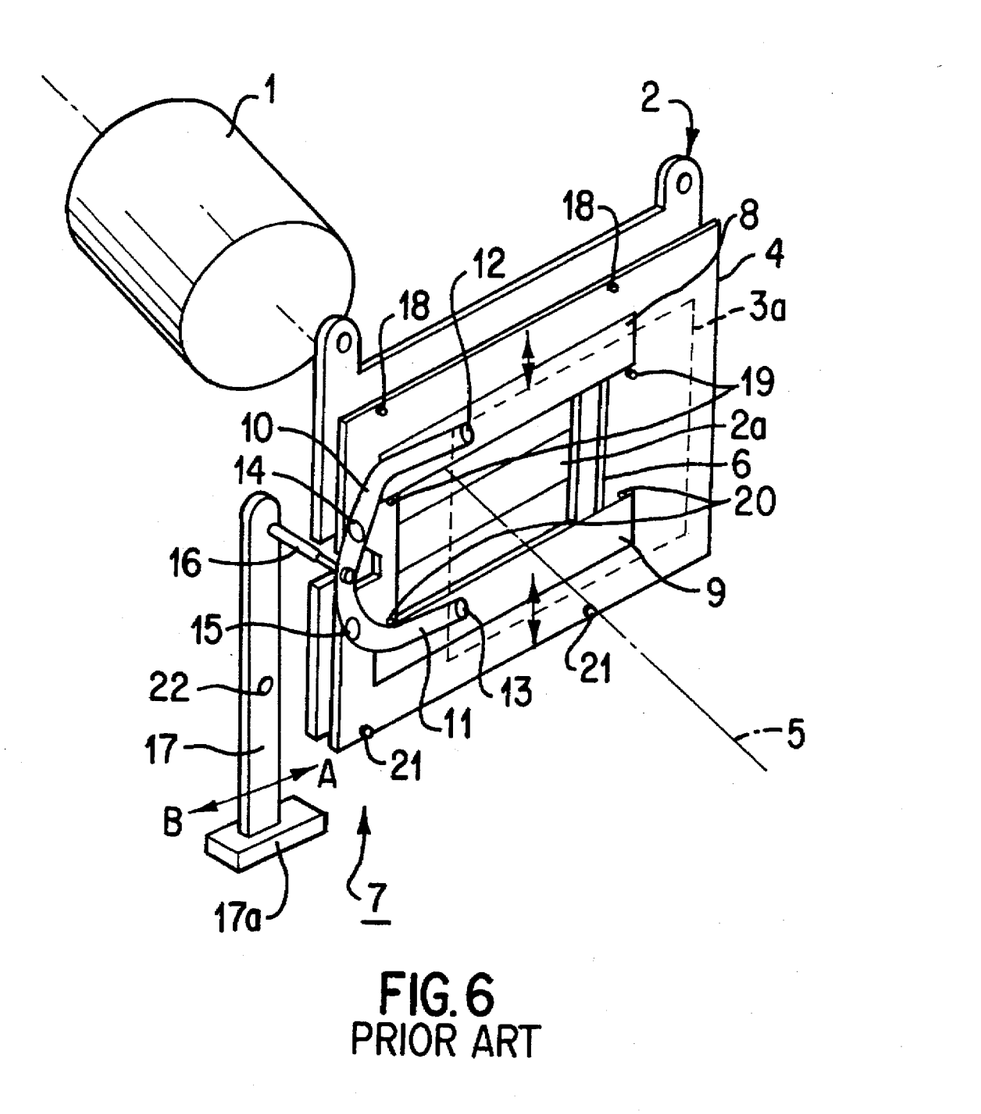
FIG. 6 is an oblique view illustrating an example of a conventional panoramic switching mechanism.

FIG. 6 is an oblique view of a conventional panoramic switching mechanism in a camera. The camera is equipped with a focal plane shutter capable of switching between a normal shooting size field and a panoramic shooting size field. A focal plane shutter (hereafter "shutter") 2 is placed in a narrow space between the shooting optical system 1 and a body (not shown) having a full size exposure aperture unit 3a. The shutter 2 is provided with a cover plate 4 in the plane facing the body. The cover plate 4 prevents flapping of the shutter blade 2a in the direction of the optical axis 5. A rectangular aperture unit 6 with nearly the same size as the exposure aperture unit 3a is provided in the middle of the shutter 2. Moreover, a space with a specified width for the running space of the shutter blade 2a is provided between the shutter 2 and the cover plate 4.

The panoramic switching mechanism 7 is equipped with a pair of light shielding members 8 and 9 facing each other on the top and the bottom of the aperture unit 6. Light shielding members 8 and 9 are positioned on one side of the cover plate 4 and the shutter 2 is positioned on the other side of the cover plate 4. Therefore, the panoramic switching mechanism 7 moves freely in the direction of the shorter edge of field size. One of the ends of each of the light shielding members 8 and 9 is connected by connecting pins 12 and 13 and supported by levers 10 and 11 at the area of the light shielding members 8 and 9, which define the shooting field size and are able to move freely. The central parts of levers 10 and 11 are supported on the cover plate 4 by pins 14 and 15 and are able to rotate freely. The ends of levers 10 and 11 not connected to the light shielding members 8 and 9 are connected to an operation member 17 by an axle 16. Upper stoppers 18 and 19 and lower stoppers 20 and 21 are provided in the cover plate 4. The stoppers 18, 19, 20 and 21 are provided in the side of the cover plate 9 opposite to the shutter 2. The upper stopper 18 and the lower stopper 21 are placed along the upper and lower edges of the cover plate 4, respectively. The upper stopper 19 and the lower stopper 20 are placed at the top and the bottom of the aperture unit 6, respectively. The space between the stoppers is smaller than the dimension of the shorter side of the aperture unit 6. The stoppers 18, 19, 20 and 21 define the dimensions of the shorter side (13 mm) of panorama shooting size. The central section of the operation member 17 is pivotably supported by an axle 22 so that operation member 17 is able to rotate freely in the direction of arrows A and B. The axle 16 is attached to one of the ends of the operation member 17, and the other end, forming an operation unit 17a is exposed to the outside of the camera body.

According to the above structure, FIG. 6 illustrates a state wherein the panorama size is selected by moving the operation member 17 in the direction of the arrow A. During movement, light shielding member 8 is moved to cover the top section of the aperture unit 6 when it contacts and is stopped by the upper stopper 19 at the lower extent of its movement. The other light shielding member 9 is moved to cover the bottom section of the aperture unit 6 when it is stopped by the lower stopper 20 at the upper extent of its movement. Thus, the shorter side length of the field is set at the length of the panorama size, and a panorama field shooting size is set. Switching from panorama field size shooting to full field size shooting is accomplished by manually moving the operation unit 17a and pivoting the operation member 17 in the direction of arrow B. Axle 16 moves to the right and rotates levers 10 and 11 counter-clockwise and clockwise, respectively, around the pins 14 and 15. This causes the light shielding members 8 and 9 to move away from each other and be positioned outside of the shooting path. The light shielding members 8 and 9 come in contact with and are stopped by the upper stopper 18 and the lower stopper 21, respectively. Thus, the aperture unit 6 is completely opened and enables full field size shooting. The operation unit 17a is stopped at the full size position and at the panorama position by a click or detect mechanism (not shown).

In conventional cameras, such as that described above, if the distance between the light shielding members 8 and 9 and the body having the exposure aperture unit 3a is too large, the surrounding field area becomes blurry, during panoramic shooting due to the refraction of light. Therefore it is desirable to place the light shielding members 8 and 9 close to the exposure aperture unit 3a. However, with the panoramic switching mechanism 7 described above, the pins 12 and 13, which attach the light shielding members 8 and 9 at the area defining the shooting field size onto the levers 10 and 11, and the pins 14 and 15, for supporting levers 10 and 11, and the head of axle 16 are positioned in the space between the light shielding members 8 and 9 and the body. This positioning creates a space between the light shielding members 8 and 9 and the body having the exposure aperture unit 3a. Therefore, the light shielding members 8 and 9 cannot come close to the body. Thus, the surrounding area of the shooting field becomes out of focus during panoramic shooting, and a clear image is not produced.

Moreover, in the above-described conventional camera mechanism, small parts are needed to attach the light shielding members 8 and 9, such as the pins 12, 13, 14 and 15 and the upper and lower stoppers 18, 19, 20, 21, resulting in burdensome installation of the mechanism.

SUMMARY OF THE INVENTION

Therefore, considering the problems associated with the conventional camera described above, it is an objective of the present invention to provide a camera that is capable of producing a clear image by avoiding blurring subjects in the surrounding area of the field caused by light refraction during panoramic shooting. The present invention achieves this by providing virtually no space between the body having an exposure aperture unit and the light shielding member.

Furthermore, it is an object of the present invention to provide a camera that prevents flapping of the shutter blades. This object is achieved by positioning, matching and inserting the support member for the light shielding members into a concave section of the cover plate so that the space between the cover plate and the body is minimized. Moreover, the present invention aims to provide a camera that is easy to assemble with few parts. The present invention also provides a camera that is equipped with a switching mechanism for switching between the full field shooting size and panorama field shooting size.

In order to accomplish these objectives, the invention provides a camera comprising at least one light shielding member capable of changing the field shooting size. The at least one light shielding member is positioned between the shutter, which includes a cover plate, and the body having an exposure aperture unit. The camera also comprises a supporting member installed in the body to support the light shielding member for movement. A switching mechanism switches the exposure aperture unit between shooting field sizes by moving the light shielding member. The switching mechanism is attached to an area other than the area that defines the field shooting size.

The present invention also provides the light shielding member comprising a protruding component and an elongated hole. The protruding component is inserted through the elongated hole. The supporting member also comprises a protruding component located inside a concave section formed within the cover plate.

The present invention also achieves another of its objectives by providing a surface corresponding to the concave section facing a shutter in the cover plate. The surface forms a convex section and regulates the shutter blade moving space of the focal plane shutter in the direction of the optical axis.

The invention also includes a body comprising an attachment unit outside of the film running space on the side of the film plane. The supporting member is fixed on the attachment unit on the side opposite the film plane of the body. The attachment unit of the body also regulates the position of the film.

The invention further achieves its objectives by providing a camera comprising at least one light shielding member capable of changing the shooting field size between the shutter, which contains a cover plate, and the body having an exposure aperture unit. The supporting member holds the at least one light shielding member and allows movement in the direction of the shorter edge of the field size. A switching mechanism switches the exposure aperture unit between the sizes by moving the at least one light shielding members. The supporting member is positioned in the body. The light shielding member is formed in the shape of a thin plate and comprises a rectangular aperture unit and an elongated hole. The supporting member is inserted through the elongated hole.

The light shielding member further comprises a connection unit to connect to the switching mechanism. The connection unit is in an area other than the area defining the field size and is supported by a guide unit provided in the body so that the connection unit freely moves.

Further, the invention achieves its objectives by providing a camera comprising a pair of light shielding members capable of changing field size between a shutter, which contains a cover plate, and the body having an exposure aperture unit. A supporting member supports the pair of light shielding members allowing movement to change the shooting field size. A switching mechanism switches the size of the exposure aperture unit by moving the light shielding member. The supporting member is installed in the body. Each of the light shielding members is a thin plate shape comprising a rectangular aperture unit, which encompasses an elongated hole and a connection unit, an area other than the area defining the field shooting size, to be connected to the switching mechanism. The switching mechanism includes a pivoting or revolving lever connected to the light shielding members via the connecting units. The switching mechanism moves the light shielding members simultaneously in opposite directions. An operation device enables rotation of the revolving lever.

The invention also achieves its objectives noted above by including a pair of connecting pins protruding on both sides of the center of the lever. Each connecting pin is inserted through an elongated hole formed in the connecting unit of each light shielding member. Each connection unit of the light shielding member is supported by a guide unit provided in the body to move freely.

Further, the invention also achieves its objectives by providing the body comprising a stopper unit regulating the angle of rotation of the revolving lever. The operation device is provided outside of the camera body and can be operated manually.

The objective of the invention are further achieved by the support member supporting the light shielding members by being inserted through the elongated hole of a light shielding member. Thus, the light shielding member freely moves. Moreover, the support member is provided on the plane facing the shutter of the body having an exposure aperture unit, enabling the body and the light shielding member to come closer to each other. A concave section of the cover plate is provided to enable the cover plate to come as close to the body side as possible by freeing a protruding component of the support member. Further, a convex section of the cover plate prevents flapping of the shutter blades in the shutter by regulating the shutter blade running space.

The attachment unit of the body is located outside of the film running space and guides the film and prevents vertical movement of the film. Moreover, the attachment member prevents protrusion of the support member in the side of the film running plane by attaching the support member to the plane opposite from the film plane in the body.

BRIEF DESCRIPTION OF THE DRAWINGS

Preferred embodiments are described with reference to the drawings, in which like reference characters denote like elements throughout the figures, and in which.

DETAILED DESCRIPTION OF PREFERRED EMBODIMENTS

A detailed description of an embodiment of a camera according to the present invention is provided hereafter, with reference to drawings.

In these figures, the parts that are the same or equivalent to those of the conventional camera in FIG. 6 are identified with the same reference symbols; hence, a detailed explanation of these elements is omitted.

In the figures, 3 is a body or the structural member of the camera. The body 3 is formed in one piece and includes a base unit 3A and a body unit 3B. Base unit 3A is board-like and disposed substantially parallel to the optical axis 5. Body unit 3B has a top planar configuration that is approximately concave and is essentially vertical in a plane approximately above the rear section of the board-like base unit 3A. The camera body includes the body 3 together with a front cover (not shown), back cover (not shown), top cover (not shown), and a bottom cover 31, etc. The front cover, back cover, top cover and bottom cover are attached to the front, back, top and bottom surface of the body 3, respectively. The central section 30a of the body unit 3B is made thin. The exposure aperture unit 3a is provided in the central section 30a. Both of the edge sections of the body 3 are formed with considerable thickness to form a shell structure. A cartridge chamber 30b and a winding spool chamber 30c for the film 32 are formed with in the shell.

In the back surface of the body unit 3B are the multiple film guard rails 33 and 34, which extend in the direction of running film. The film guard rails sandwich the exposure aperture unit 3a. A protrusion section 35 extends from the central section 30a above the exposure aperture unit 3a. The protrusion section 35 is provided outside of the film running space and forms an attachment unit for a support member 38. Support member 38 supports the front and back light shielding members 36 and 37, for free vertical movement (to be explained hereafter). The lower surface 35a of the protrusion section 35 also forms a stopper surface to regulate upward movement of the light shielding members 36 and 37 in the direction of the shorter edge of the film 32. A protrusion section 39 is provided in the back side of the body unit 3B and toward the bottom of the guide rail to guide and support the bottom edge of the film 32.

Figure 2:
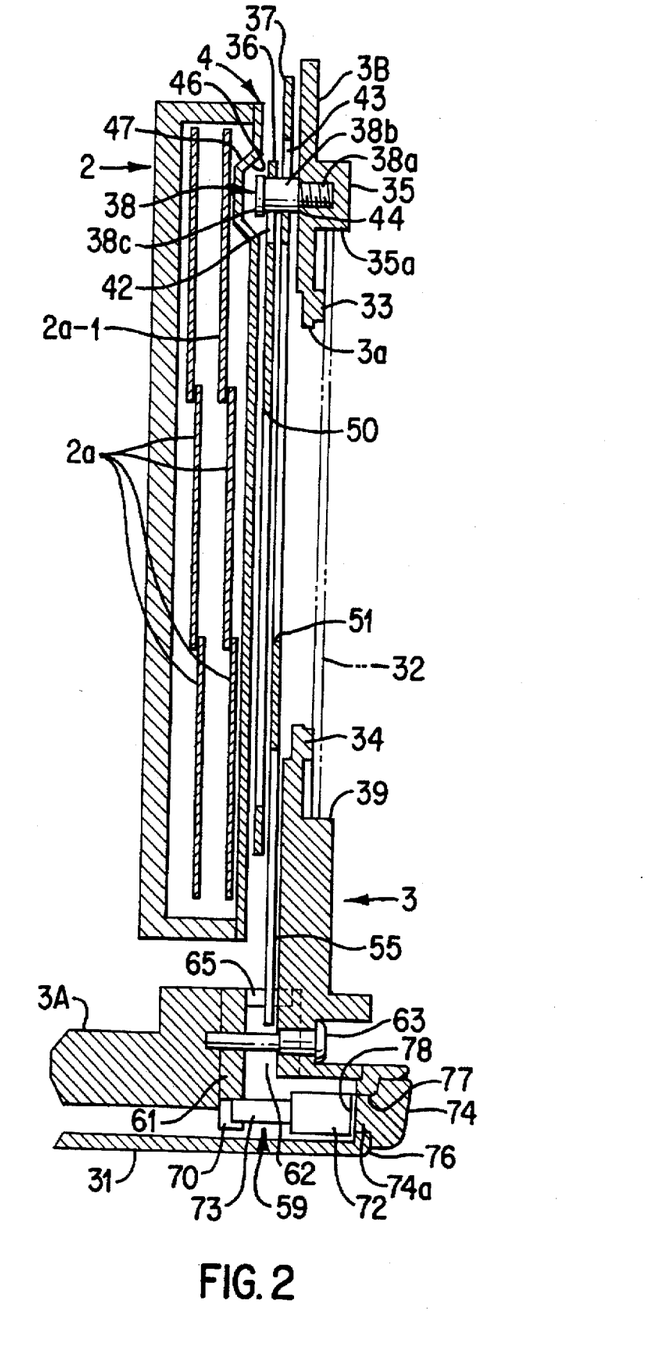
FIG. 2 is a cross section of the camera.
Figure 3:
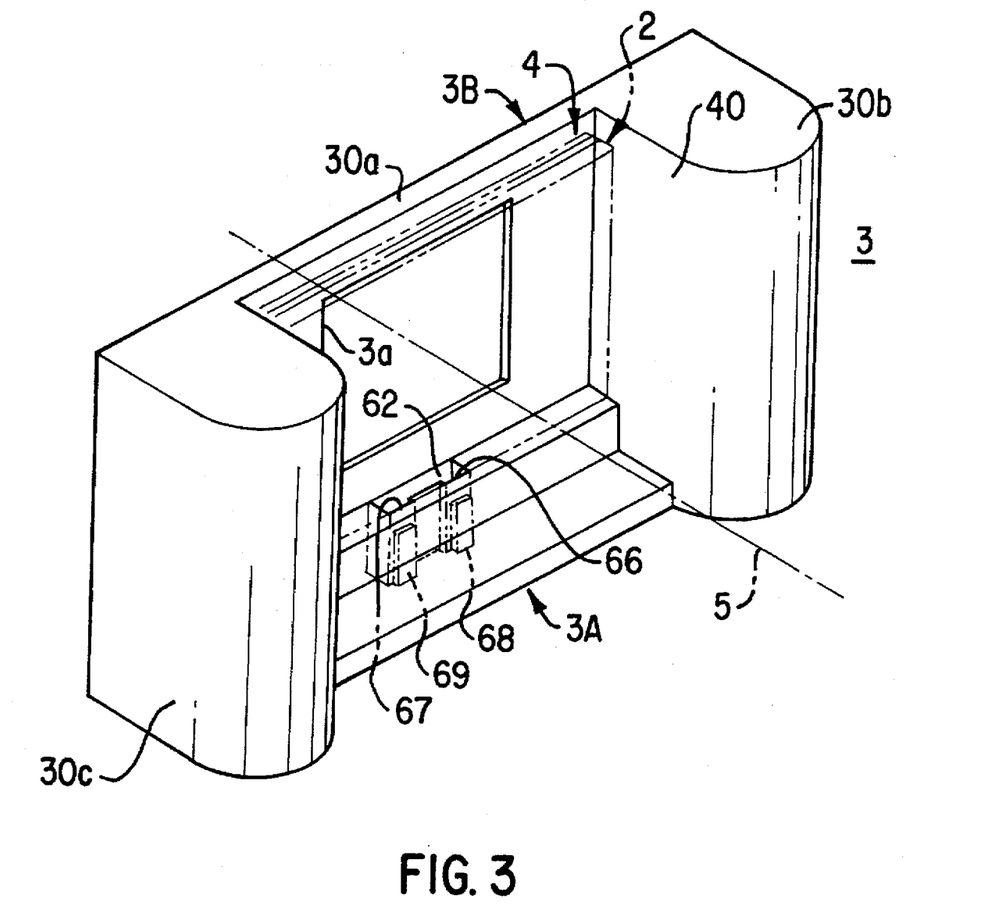
FIG. 3 is an oblique view of the body.

The shutter 2, including the cover plate 4, is located inside a convex section 40 formed in the center section of the front surface of the body 3. The shutter 2 is substantially perpendicular to the optical axis 5 and maintains a small space of approximately 0.2 mm–0.5 mm between the front surface of the central section 30a and the shutter 2. In this small space, the pair of light shielding members 36 and 37 are provided. The light shielding members 36 and 37 are supported by the support member 38 to permit free vertical movement of the light shielding members 36 and 37. The light shielding member 37 in the back side virtually touches or is very close to the front surface of the central section 30a. For illustrative purposes only, FIG. 2 shows the light shielding member 37 a distance away from the central section 30a, however in reality they are virtually touching.

The support member 38 comprises a stepped screw having, as one unit, a male screw unit 38a, a large diameter section 38b, and a protruding head 38c. The male screw unit 38a is inserted through elongated holes 42 and 43. Elongated holes 42 and 43 extend in the direction of the shorter edge of the field shooting size and are formed in the top side portion of the central section of each of the light shielding members 36 and 37. The support member 38 is screwed into the protrusion section 35 from the front side of the central section 30a. The large diameter section 38b and the drop surface 44 make contact with the front surface of the central section 30a. The large diameter section 38b is placed within the elongated holes 42 and 43 extending slightly longer than the combined thickness of each of the light shielding members 36 and 37, illustrated in FIG. 2. This arrangement also guides the light shielding members 36 and 37 in a smooth vertical movement. To prevent the light shielding members 36 and 37 from falling off of the support member 38, the diameter of the head 38c is made larger than the width of the elongated holes 42 and 43. The protruding head 38c is located within a depression or concave section 46 formed in the back surface of the cover plate 4 at the central upper section. An extension or convex section 47, of a trapezoidal shape, is formed on the front surface side of the cover plate 4 (i.e., the part corresponding to the concave section 46 in the surface opposing shutter 2). The convex section 47 forms a stopper unit to regulate and prevent flapping of the shutter blades 2a and 2a-1 at the top end of the shutter 2 in the direction of the optical axis 5.

The pair of light shielding members 36 and 37 are made of thin metal plates, etc. and are preferably formed in a rectangle frame shape. Aperture units 50 and 51, which have nearly the same size as the exposure aperture unit 3a, are provided on the central section of the light shielding members 36 and 37 in an area other than the area of the members 36 and 37 that define the field shooting size. This arrangement assures that only members 36 and 37 will enter into the exposure aperture unit 3a. The aperture units 50 and 51 correspond to the exposure aperture unit 3a. The aperture units 50 and 51 are configured to slightly shift away from each other. Plate-like connection units 54 and 55 are provided in the middle of the bottom edge of each pair of light shielding members 36 and 37. Elongated holes 56 and 57 are provided in the bottom section of the connection units 54 and 55. The connection units 54 and 55 of the light shielding members 36 and 37 are positioned sandwiching and nearly equidistant from the optical axis 5. A switching mechanism 59 to move the light shielding members in a vertical direction is provided at the lower part of the light shielding members 36 and 37. The switching mechanism 59, along with the light shielding members 36 and 37, compose a panoramic switching mechanism 60.

The switching mechanism 59 includes a revolving lever 61 for vertically moving the light shielding members 36 and 37. The revolving lever 61 is provided along a cutout 62a in the wall of the front side of the dropped concave section 62. The cutout 62a is oriented vertically through the connection unit of the plate-like base unit 3A of the body 3 and the main body section 3B. The central part of the revolving lever 61 is supported by an axle pin 63. Axle pin 63 is attached from the back side of the body 3 and rotates freely. Left and right connection pins 64 and 65 are placed on the revolving lever 61. Pins 64 and 65 protrude from both sides of the lever, and the axle pin 63 is positioned between the connection pins 64 and 65. Connection pins 64 and 65 are inserted into left and right pairs of guide grooves 66 and 67, which are formed in the front side cutout 62a. The connection units 54 and 55 are inserted into the guide grooves 66 and 67 so that the connection units 54 and 55 are free to slide but are horizontally restricted. The connection pins 64 and 65 are inserted and coupled to the elongated holes 56 and 57. The grooves 68 and 69 are formed in the bottom surface at the middle of each of the guide grooves 66 and 67. Tips of each of the connection pins 64 and 65 are inserted through the grooves 68 and 69. These grooves 68 and 69 constitute stopper units for regulating the angle of rotation of the revolving lever 61.

As described above, the grooves 66 and 67 are provided as guide units to guide and support the connection units 54 and 55. However, it is equally effective to provide a protrusion body that protrudes into the cutout 62a of the front surface.

An upside-down U-shaped long groove 70 is formed in the middle of the lower surface of the revolving lever 61. A slider 72 with a connection pin 73 is inserted into the long groove 70. The slider 72 is connected to an operation button 74 by a connector 75. The operation button 74 is positioned inside a long concave cutout section 76 that extends left to right. The cutout section is formed on the outer surface of an upstanding portion 31a of the lower cover 31 at the back side. The operation button 74 is freely slidable in the cutout section 76. A base unit 74a of the operation button 74 is inserted through the horizontally extending elongated hole 77 into the camera body formed by the lower cover 31. The base unit 74a is then connected to the slider 72. A plate spring 78 is positioned at the inner surface of the upstream portion 31a between the slider 72 and the base unit 74a. The plate spring 78 extends horizontally and has V-shaped protrusions 78a and 78b provided on both ends with the convex part of the "V" facing the back of the camera. Left and right stopper concave units (not shown) are provided in the inner surface of the upstanding portion 31a corresponding to the protrusions 78a and 78b. These elements constitute a click mechanism or detent 80 that stops the operation button 74 at the full field shooting size position, the panorama field shooting size position or other field shooting size position.

Figure 1:
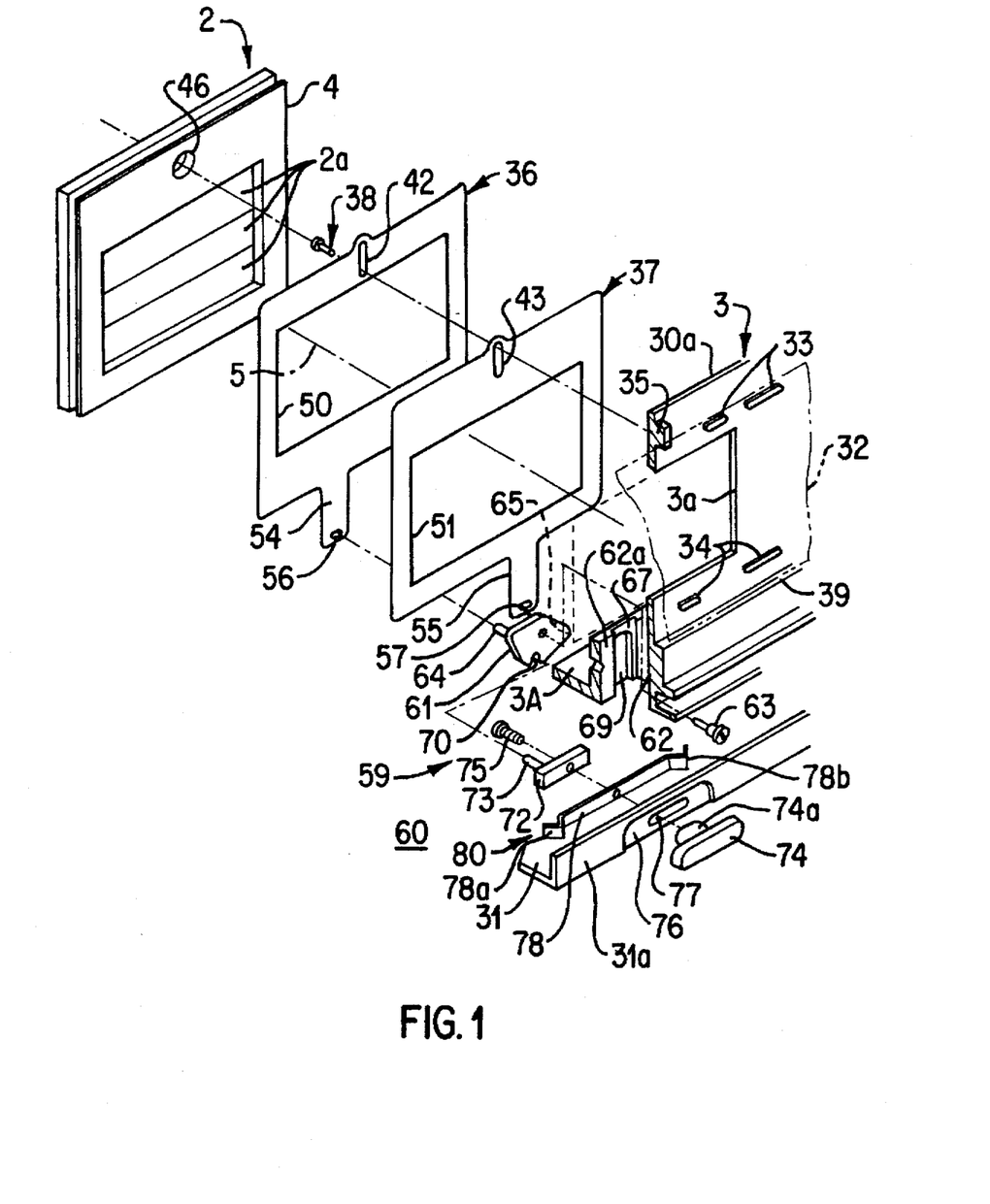
FIG. 1 is an exploded view illustrating the major parts of an embodiment of the camera in the present invention.

When the operation button 74 slides to the left in FIG. 1 and the stop protrusions 78a and 78b correspond to one stopper concave unit (not shown), the operation button 74 can be stopped at one field shooting size position. If the operation button 74 slides to the right and the stop protrusions 78a and 78b are at the other stopper concave unit, the operation button 74 can be stopped at another field shooting size position.

The operation of the switching mechanism 60 having the structure described above as provided hereafter will be explained with reference to full and panoramic shooting field sizes.

Figure 4:
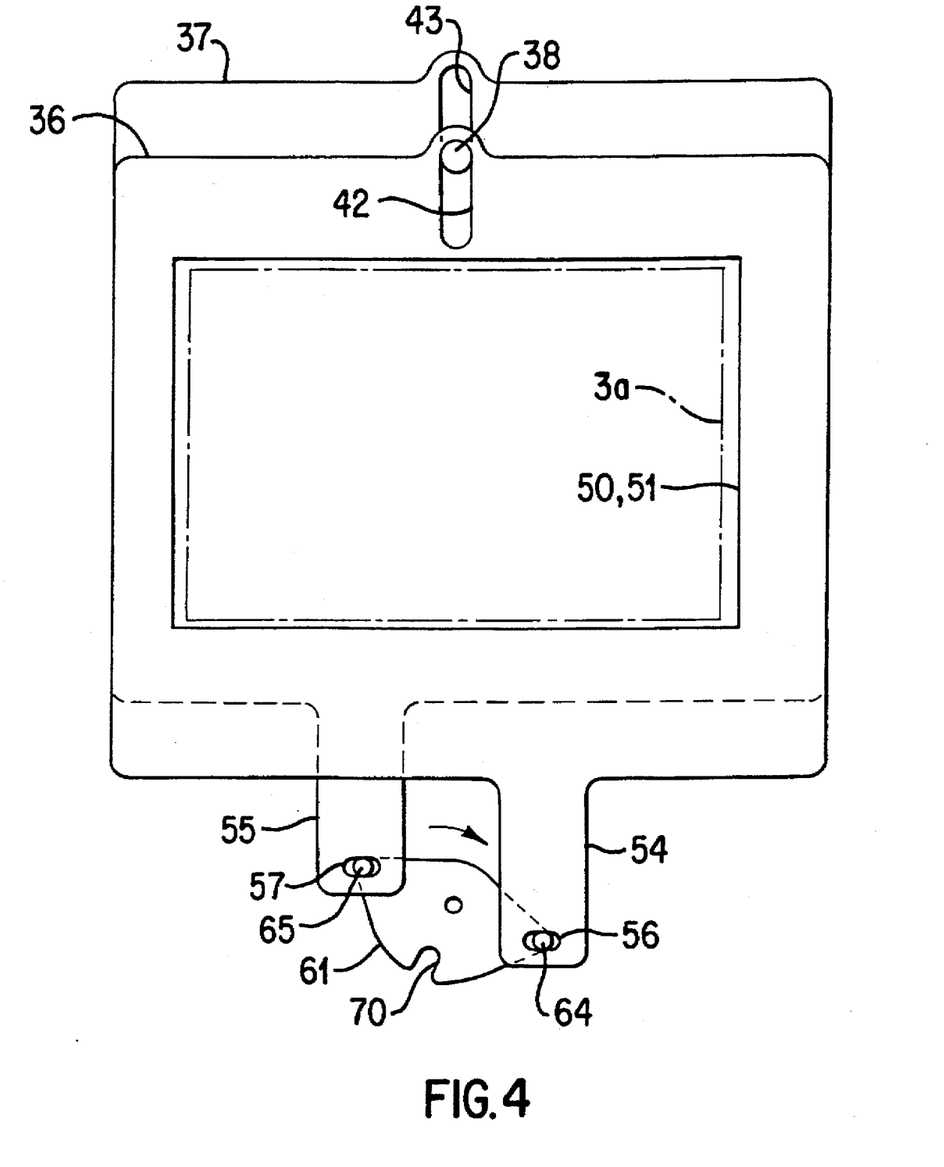
FIG. 4 is a front view illustrating the relative positions of the aperture unit of the exposure aperture unit and the aperture unit of the light shielding member during full size shooting.

In FIG. 1, when the operation button 74 slides right and is stopped by the click mechanism 80 at the full field shooting size position, the slider 72 moves to the right with the operation button 74. The pin 73 rotates the revolving lever 61 counter-clockwise as shown in FIG. 1 (clockwise in FIG. 4). The angle of revolution of the revolving lever 61 is regulated by the connection pins 64 and 65 coming into contact with the left wall (from the front of the camera) of the grooves 68 and 69. When the revolving lever 61 rotates counter-clockwise by a specified angle as shown in FIG. 1, the connection pin 64 on the left side drops and thereby moves the light shielding member 36 downward by a specified distance. At the same time, the connection pin 65 on the right side rises and moves the light shielding member 37 upward by a specified distance, as illustrated in FIG. 4. In this position, the aperture units 50 and 51 of the pair of light shielding members 36 and 37 coincide with the exposure aperture unit 3a, thereby establishing the full field size shooting mode.

Figure 5:
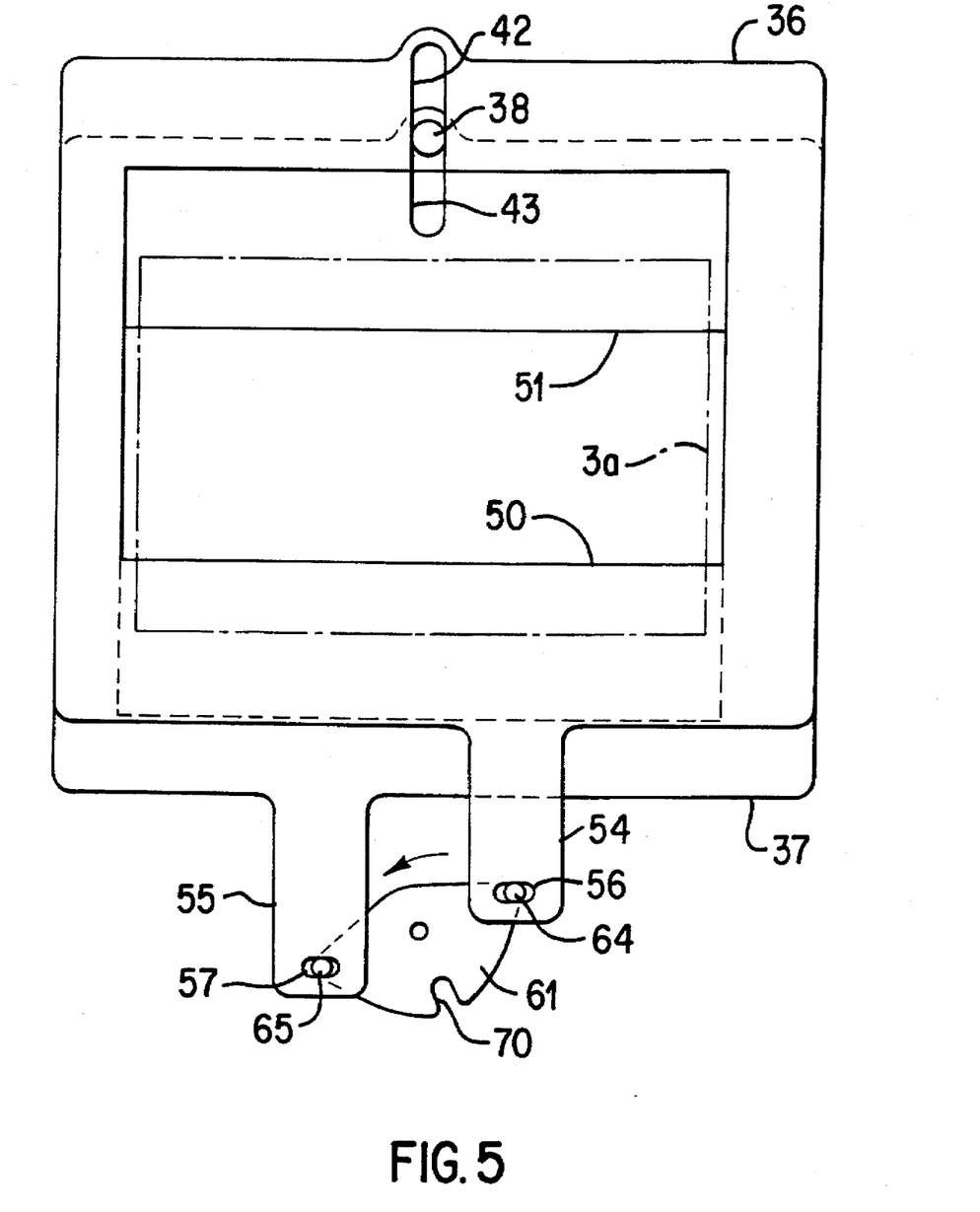
FIG. 5 is a front view illustrating the relative positions of the aperture unit of the exposure aperture unit and the aperture unit of the light shielding member during panorama size shooting.

Next, when the operation button 74 slides left in FIG. 1 and is stopped by the click mechanism 80 at the panorama size position, the slider 72 moves to the left with the operation button 74. This causes the pin 73 to rotate the revolving lever 61 clockwise as shown in FIG. 1 (counter-clockwise in FIG. 5). The angle of revolution of the revolving lever 61 is regulated by the connection pins 64 and 65 coming into contact with the right wall (from the front of the camera) of the grooves 68 and 69. When the revolving lever 61 rotates clockwise by a specified angle, as shown in FIG. 1, the connection pin 64 on the left side rises and thereby moves the front side light shielding member 36 upward a specified distance. At the same time, the connection pin 65 on the right side drops and moves the back side light shielding member 37 downward a specified distance, as illustrated in FIGS. 2 and 5. In this position, the lower edge section of the front side light shielding member 36 covers the top section of the exposure aperture unit 3a (or the aperture unit 6 in the cover plate 4), and the top edge section or area defining the field shooting size of the back side light shielding member 37 covers the top section of the exposure aperture unit 3a. The dimension of the exposure aperture unit 3a is shortening in the direction of its shorter edge, thereby establishing the panorama field size shooting mode.

With a camera equipped as described, a supporting member 38 is provided to support the light shielding members 36 and 37, permitting free movement in the direction of the shorter edge of the field size. This enables the protruding head 38c to be positioned in front of the front side light shielding member 36. Therefore, the back side light shielding member 37 can be placed as close to the front surface of the body 3 as possible. This eliminates excessive space between the light shielding member 37 and the body 3 and minimizes the loss of focus caused by the refraction of light in the surrounding area of the field during panoramic shooting. A clear photograph results with the minimizing of this space. Moreover, accuracy is improved in determining the position of the light shielding members 36 and 37 when the shooting field size mode is switched.

The protruding head 38c of the supporting member 38 is positioned in the concave section 46, preventing the protruding head 38c from interfering with the cover plate 4. This also assists in making the space between the body 3 and the cover plate 4 as small as possible. Moreover, the convex section 47 of the cover plate 4 facing shutter 2 regulates the shutter blade running space in the direction of the optical axis. The convex section 47 also prevents the flapping of the shutter blades 2a in the direction of the optical axis. Furthermore, the support member 38 cannot be seen from the front of the body because the protrusion section 38a is located in the concave section 46. This results in an excellent exterior appearance.

Furthermore, any protrusion of the support member 38 toward the film surface side is avoided by making the protrusion section 35 attach to the support member 38 and extend toward the film surface side of the body 3. Moreover, the protrusion section 35 is positioned outside of the film running space, which enables the bottom surface 35a to act as a stopper, or guide for regulating the vertical movement of the film 32.

A shift of the light shielding members 36 and 37 in the horizontal direction is prevented by providing the guide grooves 66 and 67 in the body 3 to support the connection units 54 and 55. In this way, the connection units 54 and 55 move freely in the direction of the shorter edge of the field size. Moreover, the stoppers 68 and 69 of the guide grooves 66 and 67 regulate the angle of rotation of the revolving lever 61 and make the switching of full field size shooting and panoramic field size shooting exact.

The above-described embodiment uses a pair of light shielding members 36 and 37. However, the present invention is not meant to be limited thereto. It is possible to shorten the length of the shorter edge of the field size using only one of the pair of light shielding members.

Moreover, the switching mechanism 59 is made to operate by manual operation of the operation button 74. Switching between full field size and panorama field size shooting modes can be executed by other equivalent means. For instance, the switching can be accomplished automatically by providing a driving motor within the camera body and transmitting the motor's rotation to the lever 61 through a rotation transmission mechanism, such as a gear, cam, lever, or the like.

Furthermore, with the present invention a stepped screw was used as a support member 38 for the light shielding members 36 and 37. It is equally effective to use other equivalent structure, such as pins having a section with a large diameter or the like.

With a camera as described above, a support member 38 supporting the light shielding members 36 and 37 for free vertical movement is anchored to the body 3 from the shutter side. A protruding of the support member 38 does not exist between the light shielding members 36 and 37 and the body 3. Thus, the light shielding members 36 and 37 can be placed as close to the front of the body 3 as possible, making the space between the body 3 and the light shielding members 36 and 37 virtually non-existent. Thus, refraction of light during panoramic field size shooting is minimized or prevented. This enables clear photographing of a subject in the surrounding area of the field size. Moreover, accuracy for positioning of the light shielding members 36 and 37 is improved when switching shooting field modes by having the light shielding members 36 and 37 as close to the body 3 as possible.

Moreover, a concave section 46 is provided in the cover plate 4. The protruding head 38c of the supporting member 38 is positioned in the concave section 46 preventing the protruding section from interfering with the cover plate 4. Thus, the space between the body 3 and the cover plate 4 (i.e., the distance between the shutter and the film) is made as small as possible. Moreover, the convex section 47 is provided in the surface facing shutter of the cover plate 4. This convex section 47 regulates the shutter blade running space in the direction of the optical axis 5 and prevents flapping of the shutter blades 2a and 2a-1 in the direction of the optical axis 5.

Protrusion of the support member 38 toward the film surface side is prevented by making the attachment unit extend toward the film surface side of the body 3. Moreover, the attachment unit is positioned outside of the film running space, enabling its bottom surface to function as a stopper to regulate the vertical movement of film.

The operation button 74 of the panorama switching mechanism 80 is provided outside of the camera body. Therefore, switching between the full field size shooting and the panorama field size shooting can be easily accomplished by manual operation.

Moreover, a shift of the light shielding members 36 and 37 in the direction of the longer edge is prevented by providing guide grooves 66–69 in the body 3 to support the connection units of each light shielding member 36 and 37 so that the connection units move freely only in the direction of the shorter edge of the field size. Furthermore, the guide grooves 66–69 include stoppers regulating the angle of rotation of the revolving lever 61, making the switching movement of full size shooting and panoramic shooting exact.

While this invention has been described with conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A switching mechanism for changing the shooting field size in a camera, comprising:
   first and second shielding members, each including an area defining a shooting field size and formed as a thin plate, each plate including an opening therein defining an aperture unit in the shape of a rectangle; and
   a switching unit adapted for changing the shooting field size, the switching unit interacting with an other area of each of the first and second light shielding members outside of the area defining the shooting field size, the switching unit moving the first and second light shielding members.

2. A switching mechanism according to claim 1, wherein the switching unit includes a lever attached to the other area of the first and second light shielding members.

3. A switching mechanism according to claim 2, including operating means for moving the lever.

4. A switching mechanism according to claim 2, wherein the lever includes an axle pin supporting the lever for pivotal movement.

5. A switching mechanism according to claim 1, wherein the other area of the first and second light shielding members is a connection unit adapted to be connected to the switching unit.

6. A switching mechanism according to claim 5, wherein the connection unit is integral with the first and second light shielding members.

7. A switching mechanism according to claim 5, wherein the connection unit includes a hole adapted to receive the switching unit.

8. A switching mechanism according to claim 4, wherein the lever includes at least one connecting pin attachable to the other area of the first and second light shielding members, the connecting pin transmitting movement from the lever to the other area for vertically moving the first and second light shielding members.

9. A switching mechanism according to claim 8, further including two connecting pins, one connecting pin positioned on each side of the axle pin, and respectively connected to each of the first and second light shielding members.

10. A switching mechanism according to claim 1, wherein the switching unit includes an operation element outside of the camera for transmitting a switching force to the first and second light shielding member.

11. A switching mechanism according to claim 10, wherein the operation element moves between at least two positions for changing the shooting field position of the first and second light shielding members, the at least two positions defined by a detent mechanism for stopping movement of the operation element.

12. A switching mechanism according to claim 11, wherein the detent mechanism includes a plate spring having resilient catch portions engageable with the operation element and defining the at least two positions of the operation element.

13. A switching mechanism according to claim 1, further including limiting means for limiting the movement of the switching unit during movement of the first and second light shielding members, and wherein the camera has a body, the body defining the limiting means.

14. A switching mechanism according to claim 13, wherein the limiting means is defined by a groove in the body for limiting the movement of the switching unit during movement of the first and second light shielding members.

15. A switching mechanism according to claim 14, wherein the switching unit further includes a rotatable lever interacting with the other area of the first and second light shielding members, the lever including at least one connection pin engageable with the other area of the first and second light shielding members for transmitting movement of the lever to the area of the first and second light shielding members for vertically moving the first and second light shielding members, and wherein movement of the at least one pin is limited by the groove.

16. A switching mechanism according to claim 2, wherein the camera includes a body, the body defining guide means for guiding the other area of the first and second light shielding members.

17. A switching mechanism according to claim 16, wherein the other area of the first and second light shielding members is integral with the first and second light shielding members and adapted to be connected to the lever, the guide means including a guide groove, the other area being positionable within the groove.

18. A switching mechanism according to claim 1, further including supporting structure for supporting the first and second light shielding members, the supporting structure being positioned on the first and second light shielding members generally opposed to the other area of the first and second light shielding members.

19. A variable shooting field size camera, comprising:
a body;
at least one light shielding member movable in the body and defining a shooting field size, the at least one light shielding member including a connection unit extending from an edge of the at least one light shielding member;
the body having an exposure aperture unit, wherein the at least one light shielding member is movable to block at least a portion of the exposure aperture unit and to define the shooting field size;
a switching unit directly connected to the connection unit of the at least one light shielding member to move the at least one light shielding member;
supporting structure supporting the at least one light shielding member during movement of the at least one light shielding member, wherein the supporting structure is attached to the body; and
limiting structure limiting the movement of the switching unit during movement of the at least one light shielding member.

20. A variable shooting field size camera according to claim 19, wherein the exposure aperture unit is substantially rectangular.

21. A variable shooting field size camera according to claim 19, wherein the at least one light shielding member includes an elongated hole, the supporting structure being inserted through the elongated hole.

22. A variable shooting field size camera according to claim 21, wherein the supporting structure includes a protruding head, the protruding head being inserted through the hole of the at least one light shielding member for guiding the at least one light shielding member.

23. A variable shooting field size camera according to claim 22, further including a shutter having a cover plate, the at least one light shielding member being movable with respect to the shutter and the exposure aperture unit to define the shooting field size, wherein the cover plate includes a recessed portion, the protruding head of the supporting structure being positionable within the recessed portion.

24. A variable shooting field size camera according to claim 23, wherein the shutter includes at least one shutter blade movable within the shutter, and further wherein the cover plate includes an extension portion regulating the movement of the at least one shutter blade.

25. A variable shooting field size camera according to claim 19, including at least two light shielding members, wherein the supporting structure supports each of the at least two light shielding members.

26. A variable shooting field size camera according to claim 25, wherein the at least two light shielding members each includes an elongated hole, the supporting structure being inserted through each elongated hole, each hole being substantially aligned with the other for at least a portion of their length.

27. A variable shooting field size camera according to claim 26, wherein the supporting structure includes a protruding head, and wherein the protruding head is inserted through each elongated hole for guiding the at least two light shielding members.

28. A variable field shooting size camera according to claim 19, further including attaching means for attaching the supporting structure to one side of the body, wherein film for the camera is positioned on an other side of the body, and wherein the attaching means defines a film guide guiding the film in the camera on the other side.

29. A method for switching a shooting field size of a camera having a switching unit movable to switch a shooting size and at least one light shielding member connected to the switching unit, the at least one light shielding member being supported on a supporting structure, the method comprising the steps of:
moving the switching unit;
transmitting the movement of the switching unit through an operation element outside of the camera and directly connected to the switching unit by moving the operation element between at least two positions to move the at least one light shielding member to switch the shooting field size;
guiding the movement of the at least one light shielding member;
limiting the movement of the switching unit to limit the movement of the at least one light shielding member; and
stopping movement of the operation element when the operation element interacts with a detent mechanism.

30. A method according to claim 29, wherein the at least one light shielding member includes a first light shielding member and a second light shielding member, and wherein the step of moving the at least one light shielding member includes moving the first light shielding member in a first direction and moving the second light shielding member in a second direction opposite the first direction.

31. A method according to claim 29, wherein the at least one light shielding member includes an extension and the camera includes a body having an exposure aperture unit, wherein the step of guiding includes positioning the extension in the body of the camera so that the extension is guided during movement of the at least one light shielding member.

32. A method according to claim 29, wherein the switching unit includes a pivotable lever rotatable to transmit movement to the at least one light shielding member, the camera including a body with guide groove, and the lever being pivotable within the guide groove, wherein the step of limiting includes limiting the pivoting movement of the switching lever when the lever pivots to contact a side of the guide groove.

33. A method according to claim 31, wherein the pivotable lever includes at least one connecting pin engageable with the at least one light shielding member, wherein the at least one connecting pin is positioned within at least one guide groove, the step of limiting including pivoting the lever until the pin abuts a wall of the at least one guide groove.

34. A method according to claim 29, including an operational element extending through the camera for transmitting a force to the switching unit for switching the shooting field size, wherein the step of switching includes moving the operational element to move the switching unit.

35. A method according to claim 33, wherein the supporting structure includes a protruding head and the at least one light shielding member includes an elongated hole, the protruding head being inserted through the elongated hole so that the at least one light shielding member is slidable on the protruding head, wherein the step of limiting includes moving the at least one light shielding member until the protruding head abuts against an end of the elongated hole.

36. A method according to claim 29, wherein the supporting structure includes a protruding head and the at least one light shielding member includes an elongated hole, the protruding head being positioned within the elongated hole so that the at least one light shielding member is slidable on the protruding head, wherein the step of guiding includes moving the at least one light shielding member until the protruding head abuts against an end of the elongated hole.

37. A switching mechanism for changing the shooting field size in a camera, comprising:

at least one light shielding member including an area defining a shooting field size; and a switching unit adapted for changing the shooting field size, the switching unit including a rotatable lever interacting with an other area of the at least one light shielding member outside of the area defining the shooting field size, the switching unit moving the at least one light shielding member, wherein the switching unit includes an operation element outside of the camera and directly connected to the rotatable lever for transmitting a switching force to the at least one light shielding member, the operation element moves between at least two positions for rotating the rotatable lever and changing the shooting field position of the at least one light shielding member, the at least two positions defined by a detent mechanism for stopping movement of the operation element.

38. A switching mechanism for changing the shooting field size in a camera, comprising:

at least one light shielding member including an area defining a shooting field size;

a switching unit adapted for changing the shooting field size, the switching unit interacting with an other area of the at least one light shielding member outside of the area defining the shooting field size, the switching unit moving the at least one light shielding member; and guide structure adapted to receive the other area of the at least one light shielding member and permit movement of the light shielding member along only one axis, the guide structure also limiting the movement of the switching unit during movement of the at least one light shielding member.

39. The switching mechanism of claim 38, wherein the guide structure includes a groove sized to receive the other area of the at least one light shielding member.

40. The switching mechanism of claim 38, wherein the switching unit includes a rotatable lever interacting with the other area of the at least one light shielding member, and the guide structure includes a groove limiting the rotation of the rotatable lever.

* * * * *